(12) United States Patent
Terwilliger et al.

(10) Patent No.: US 12,434,849 B2
(45) Date of Patent: Oct. 7, 2025

(54) ENERGY OPTIMIZATION FOR A HYBRID ELECTRIC ENGINE

(71) Applicant: RTX Corporation, Farmington, CT (US)

(72) Inventors: Neil Terwilliger, Meriden, CT (US); Keith J. Kucinskas, West Hartford, CT (US)

(73) Assignee: RTX CORPORATION, Farmington, CT (US)

(*) Notice: Subject to any disclaimer, the term of this patent is extended or adjusted under 35 U.S.C. 154(b) by 470 days.

(21) Appl. No.: 17/396,077

(22) Filed: Aug. 6, 2021

(65) Prior Publication Data

US 2023/0042497 A1 Feb. 9, 2023

(51) Int. Cl.
| | |
|---|---|
| B64D 31/06 | (2024.01) |
| B60L 50/60 | (2019.01) |
| B64D 27/02 | (2006.01) |
| B64D 27/10 | (2006.01) |
| B64D 27/24 | (2024.01) |
| F02C 9/00 | (2006.01) |

(52) U.S. Cl.
CPC .............. B64D 31/06 (2013.01); B60L 50/60 (2019.02); B64D 27/10 (2013.01); B64D 27/24 (2013.01); F02C 9/00 (2013.01); B60L 2200/10 (2013.01); B64D 27/026 (2024.01)

(58) Field of Classification Search
None
See application file for complete search history.

(56) References Cited

U.S. PATENT DOCUMENTS

| | | | |
|---|---|---|---|
| 7,802,757 B2 | 9/2010 | Dooley et al. | |
| 2011/0178649 A1 | 7/2011 | Pieri | |
| 2015/0183511 A1 | 7/2015 | Ott et al. | |
| 2015/0185111 A1 | 7/2015 | Armstrong et al. | |
| 2015/0234951 A1 | 8/2015 | Andersson et al. | |
| 2016/0236790 A1 | 8/2016 | Knapp et al. | |
| 2018/0003072 A1 | 1/2018 | Lents et al. | |
| 2018/0134400 A1* | 5/2018 | Knapp | B64D 41/007 |
| 2018/0283278 A1* | 10/2018 | Adibhatla | F01D 21/14 |

(Continued)

FOREIGN PATENT DOCUMENTS

EP   3657468 A1   5/2020

OTHER PUBLICATIONS

European Search Report Issued in European Application No. 22188388.7-1202 / 4129826 dated Jan. 31, 2023; 6 Pages.

(Continued)

*Primary Examiner* — Jason H Duger
(74) *Attorney, Agent, or Firm* — CANTOR COLBURN LLP

(57) ABSTRACT

Examples described herein provide a computer-implemented method that includes providing the hybrid electric engine, the hybrid electric engine having a gas generating core and an electric machine powered by electric energy. The method further includes determining, by a processing device, whether a use of the electric energy will increase time on wing of the hybrid electric engine of the aircraft a threshold amount. The method further includes, responsive to determining that the use of energy will increase time on wing the threshold amount, apportioning the electric energy from a battery system of the aircraft to increase the time on wing.

12 Claims, 9 Drawing Sheets

(56) References Cited

U.S. PATENT DOCUMENTS

| | | |
|---|---|---|
| 2018/0354632 A1 | 12/2018 | Hon et al. |
| 2018/0354635 A1 | 12/2018 | Wagner et al. |
| 2019/0322382 A1 | 10/2019 | Mackin |
| 2020/0055610 A1* | 2/2020 | Terwilliger ............. B60L 58/10 |
| 2020/0056546 A1 | 2/2020 | Terwilliger et al. |
| 2020/0056549 A1 | 2/2020 | Terwilliger et al. |
| 2020/0277064 A1 | 9/2020 | Thomassin et al. |
| 2020/0362768 A1 | 11/2020 | Jan et al. |
| 2021/0291964 A1 | 9/2021 | Gilbert |
| 2022/0011782 A1 | 1/2022 | Mikic et al. |
| 2022/0064174 A1 | 3/2022 | Natarajan et al. |
| 2025/0121947 A1 | 4/2025 | Terwilliger et al. |

OTHER PUBLICATIONS

EP Communication pursuant to Article 94(3) EPC corresponding to EP Application No. 22 188 388.7; Issue Date, Jan. 28, 2025, 5 pages.
U.S. Non-Final Office Action corresponding to U.S. Appl. No. 18/999,269, Issue Date, Apr. 10, 2025, 19 pages.

* cited by examiner

ENERGY OPTIMIZATION FOR A HYBRID ELECTRIC ENGINE

BACKGROUND

The subject matter disclosed herein generally relates to turbine engines and, more particularly, to energy optimization for a hybrid electric engine.

A hybrid electric gas turbine engine (or simply "hybrid electric engine") can use electricity and/or liquid fuel (e.g., jet fuel) to provide thrust to an aircraft. Hybrid electric engines can selectively use electricity or gas, depending, for example, on a flight stage, environmental conditions, and other concerns. For example, during times that require significant thrust (e.g., take off, climb, etc.), it may be more efficient to use liquid fuel to power the hybrid electric engine. However, at other times that require less thrust (e.g., taxi, cruise, descent, etc.), it may be more efficient to use electricity to power the hybrid electric engine.

BRIEF DESCRIPTION

In one exemplary embodiment, a method for managing energy usage for a hybrid electric engine of an aircraft is provided. The method includes providing the hybrid electric engine, the hybrid electric engine having a gas generating core and an electric machine powered by electric energy. The method further includes determining, by a processing device, whether a use of the electric energy will increase time on wing of the hybrid electric engine of the aircraft a threshold amount. The method further includes, responsive to determining that the use of energy will increase time on wing the threshold amount, apportioning the electric energy from a battery system of the aircraft to increase the time on wing.

In addition to one or more of the features described herein, or as an alternative, further embodiments of the method may include receiving, by the processing device, flight data. Determining whether the use of electric energy will increase the time on wing of the hybrid electric engine of the aircraft the threshold amount further includes: calculating, by the processing device, an engine component life expectancy for an engine component of the hybrid electric engine based at least in part on the flight data; determining, by the processing device, whether the engine component life expectancy is indicative of a reason for removal of the hybrid electric engine for maintenance; and determining, by the processing device, whether a use of the energy will increase engine component life expectancy the threshold amount. The method further includes responsive to the engine component life expectancy being indicative of the reason for removal of the hybrid electric engine for maintenance and responsive to determining that the use of the energy will increase the engine component life expectancy the threshold amount, apportioning electric energy from the battery system of the aircraft to extend the engine component life expectancy.

In addition to one or more of the features described herein, or as an alternative, further embodiments of the method may include, responsive to the engine component life expectancy not being indicative of the reason for removal of the hybrid electric engine for maintenance, or responsive to determining that the use of energy will not increase the engine component life expectancy the threshold amount, using the electric energy from the battery system of the aircraft to perform an e-taxi for the flight.

In addition to one or more of the features described herein, or as an alternative, further embodiments of the method may include that the data comprises ambient conditions.

In addition to one or more of the features described herein, or as an alternative, further embodiments of the method may include that the data comprises an estimated health state of the engine component or data that is used for estimation of a health state of an engine component.

In addition to one or more of the features described herein, or as an alternative, further embodiments of the method may include that the data comprises a derate setting.

In addition to one or more of the features described herein, or as an alternative, further embodiments of the method may include that the data comprises flight plan data.

In addition to one or more of the features described herein, or as an alternative, further embodiments of the method may include that the data comprises ambient conditions, an estimated health state of the engine component, a derate setting, and flight plan data.

In addition to one or more of the features described herein, or as an alternative, further embodiments of the method may include that the engine component is a high pressure turbine of the hybrid electric engine, and that the engine component life expectancy is a high pressure turbine component life expectancy.

In addition to one or more of the features described herein, or as an alternative, further embodiments of the method may include, responsive to the engine component life expectancy being indicative of the reason for removal of the engine for service, causing an alert to be issued.

In addition to one or more of the features described herein, or as an alternative, further embodiments of the method may include that apportioning the electric energy from the battery system of the aircraft to increase the time on wing comprises causing an e-taxi to be inhibited and applying the electric energy to an engine spool of the hybrid electric engine at a waypoint.

In addition to one or more of the features described herein, or as an alternative, further embodiments of the method may include that the processing device is disposed in or on the aircraft.

In addition to one or more of the features described herein, or as an alternative, further embodiments of the method may include that the processing device is remote from the aircraft and is communicatively coupled to a controller in or on the aircraft.

In another exemplary embodiment, a method is provided. The method includes receiving data about a flight of an aircraft, the aircraft comprising a hybrid electric engine. The method further includes predicting, based on the data, whether a margin for operating the hybrid electric engine for the flight will fail to satisfy a threshold without using battery power assist a shaft of the hybrid electric engine. The method further includes, responsive to predicting that the margin will fail to satisfy the threshold, causing an e-taxi to be inhibited and causing the battery power to be supplied to the hybrid electric engine to assist the shaft of the hybrid electric engine.

In addition to one or more of the features described herein, or as an alternative, further embodiments of the method may include, responsive to predicting that the margin will satisfy the threshold without providing battery power to assist the shaft of the hybrid electric engine, causing the e-taxi to be performed by supplying the battery power to the hybrid electric engine during the e-taxi.

In addition to one or more of the features described herein, or as an alternative, further embodiments of the method may include, that the data comprises at least one of ambient conditions, an estimated health state of an engine component, a derate setting, or flight plan data.

In another exemplary embodiment, a method is provided. The method includes receiving an engine component life expectancy for an engine component of a hybrid electric engine of an aircraft based at least in part on historical flight data of prior flights. The method further includes determining whether the engine component life expectancy is indicative of a reason for removal of the hybrid electric engine for maintenance. The method further includes determining whether a use of battery energy will increase the engine component life expectancy a threshold amount. The method further includes, responsive to the engine component life expectancy being indicative of the reason for removal of the hybrid electric engine for maintenance and responsive to determining that the use of the battery energy will increase the engine component life expectancy the threshold amount, apportioning electric power from a battery system of the aircraft to extend the engine component life expectancy.

In addition to one or more of the features described herein, or as an alternative, further embodiments of the method may include, responsive to the engine component life expectancy not being indicative of the reason for removal of the hybrid electric engine for maintenance, or responsive to determining that the use of battery energy will not increase the engine component life expectancy the threshold amount, use the electric power from the battery system of the aircraft to perform an e-taxi for the flight.

In addition to one or more of the features described herein, or as an alternative, further embodiments of the method may include that the engine component is a high pressure turbine of the hybrid electric engine, and that the engine component life expectancy is a high pressure turbine component life expectancy.

In addition to one or more of the features described herein, or as an alternative, further embodiments of the method may include that apportioning electric power from the battery system of the aircraft to extend the engine component life expectancy comprises causing an e-taxi to be inhibited for the flight and applying the battery energy to assist the engine while it is combusting fuel.

In addition to one or more of the features described herein, or as an alternative, further embodiments of the method may include that the historical flight data comprises at least one of ambient conditions, an estimated health state of the engine component, data to estimate a health state, a derate setting, or flight plan data.

In addition to one or more of the features described herein, or as an alternative, further embodiments of the method may include that receiving the engine component life expectancy comprises calculating the engine component life expectancy based on the historical flight data.

Other embodiments of the present invention implement features of the above-described methods in computer systems and/or computer program products.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus, system, and method are presented herein by way of exemplification and not limitation with reference to the Figures.

Figure 1A:
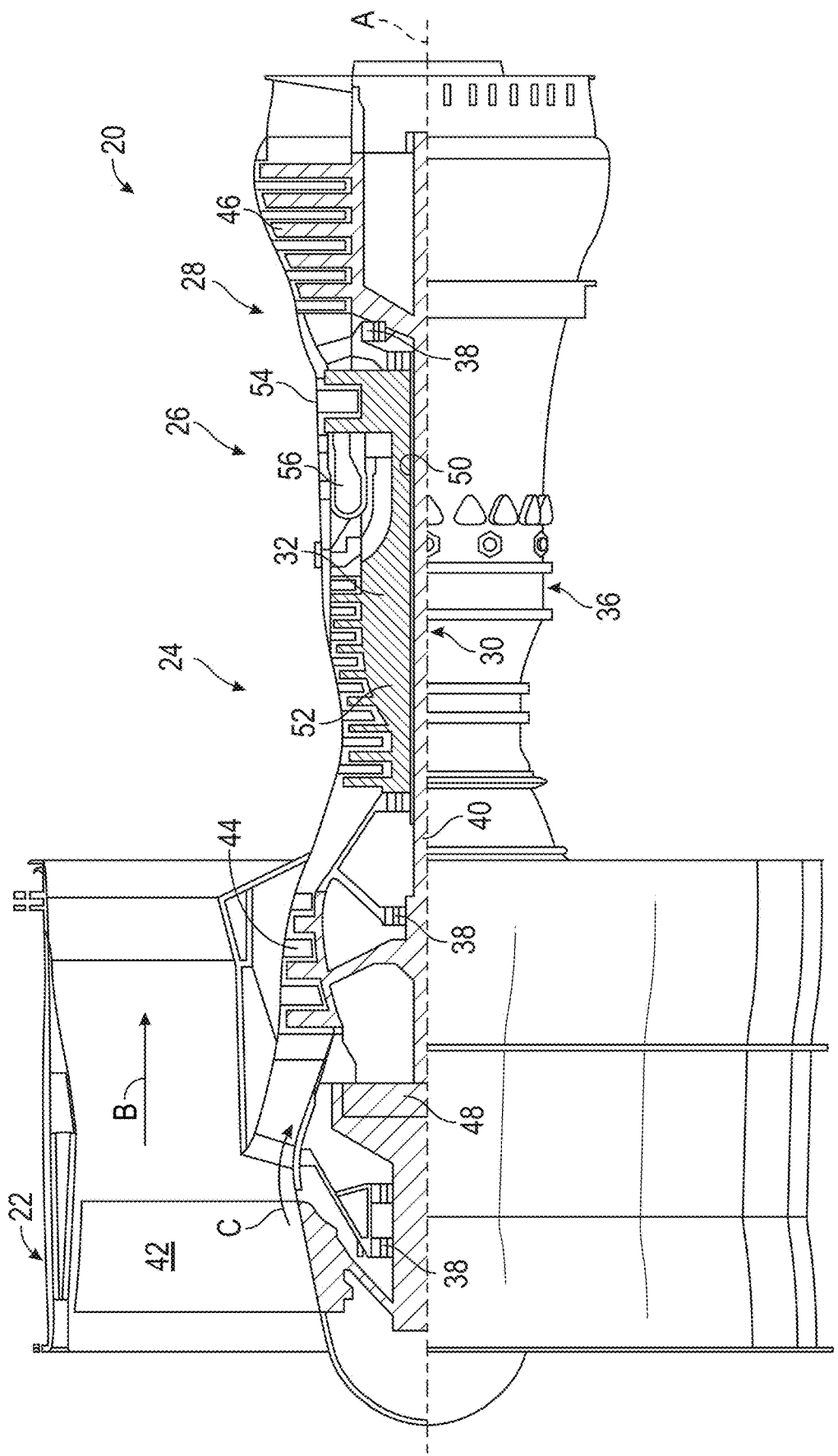
FIG. 1A is a partial cross-sectional view of a gas turbine engine according to one or more embodiments described herein.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine engine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 1B:
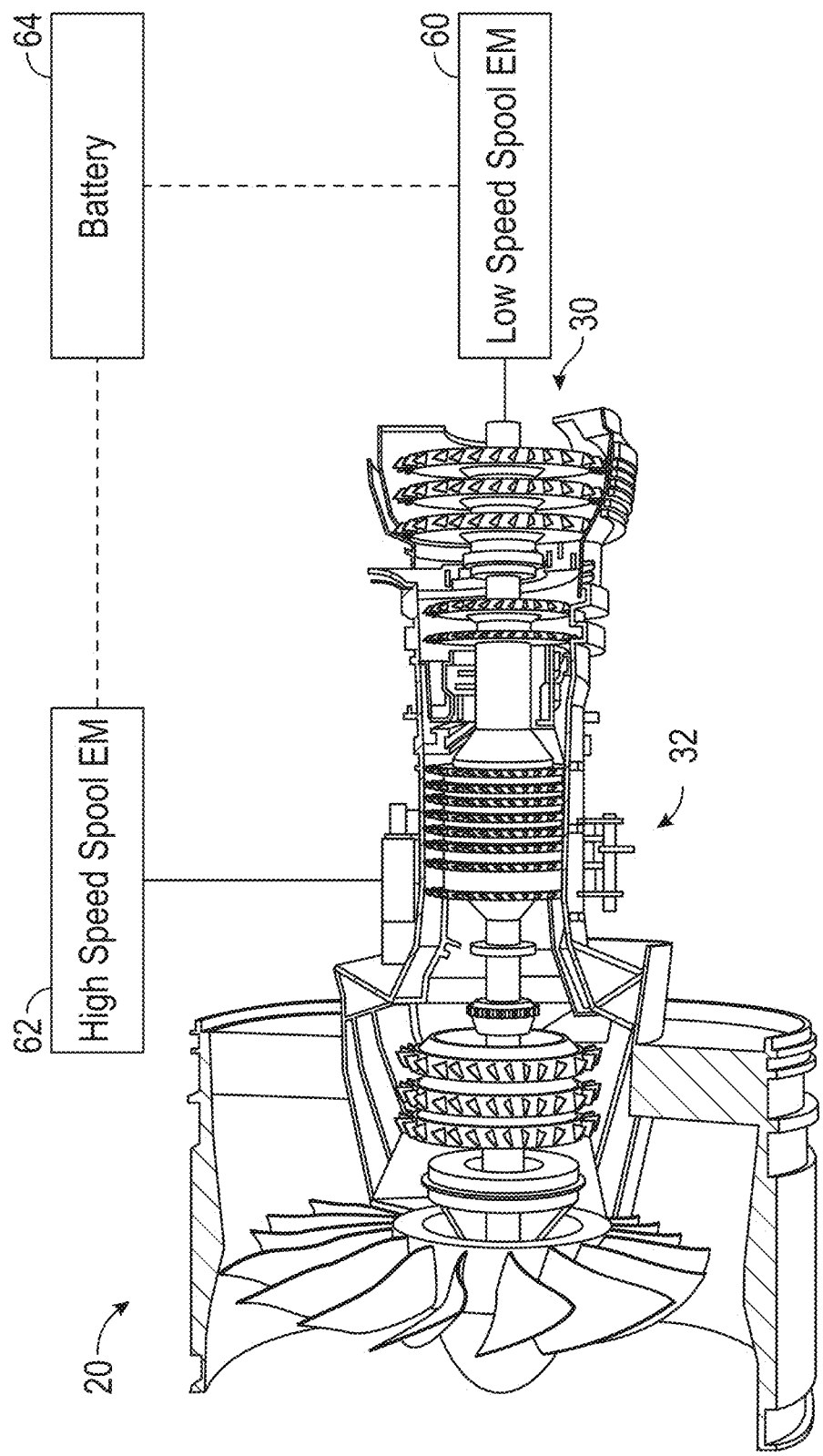
FIG. 1B is a partial cross-sectional view of a hybrid electric gas turbine engine according to one or more embodiments described herein.

The gas turbine engine 20 can be coupled to an aircraft, where the aircraft can include multiple instances of the gas turbine engine 20, which can be a hybrid electric turbine engine. Particularly, aircraft can be equipped with two or more hybrid electric turbine engines to provide thrust. Some gas turbine engines, such as hybrid electric gas turbine engines, are equipped with one or more electric machines to convert mechanical energy into electrical energy or vice versa. Two-spool hybrid electric engines can be configured with two electric machines as shown in FIG. 1B. For example, as shown in FIG. 1B, the gas turbine engine 20 includes a low speed spool electric machine 60 (e.g., a 1.0 MW low spool motor) associated with the low speed spool 30 and a high speed spool electric machine 62 (e.g., a 0.5 MW high spool motor) associated with the high speed spool 32. Each of the electric machines (e.g., one of the electric machines 60, 62) can receive electric power from and/or provide electric power to a battery 64 (e.g., a 100 kWh battery). In one or more embodiments, the connections between the electric machines (e.g., one or more of the electric machines 60, 62) and the battery 64 can include battery management, DC-DC converters, and/or other electrical components.

Figure 1C:
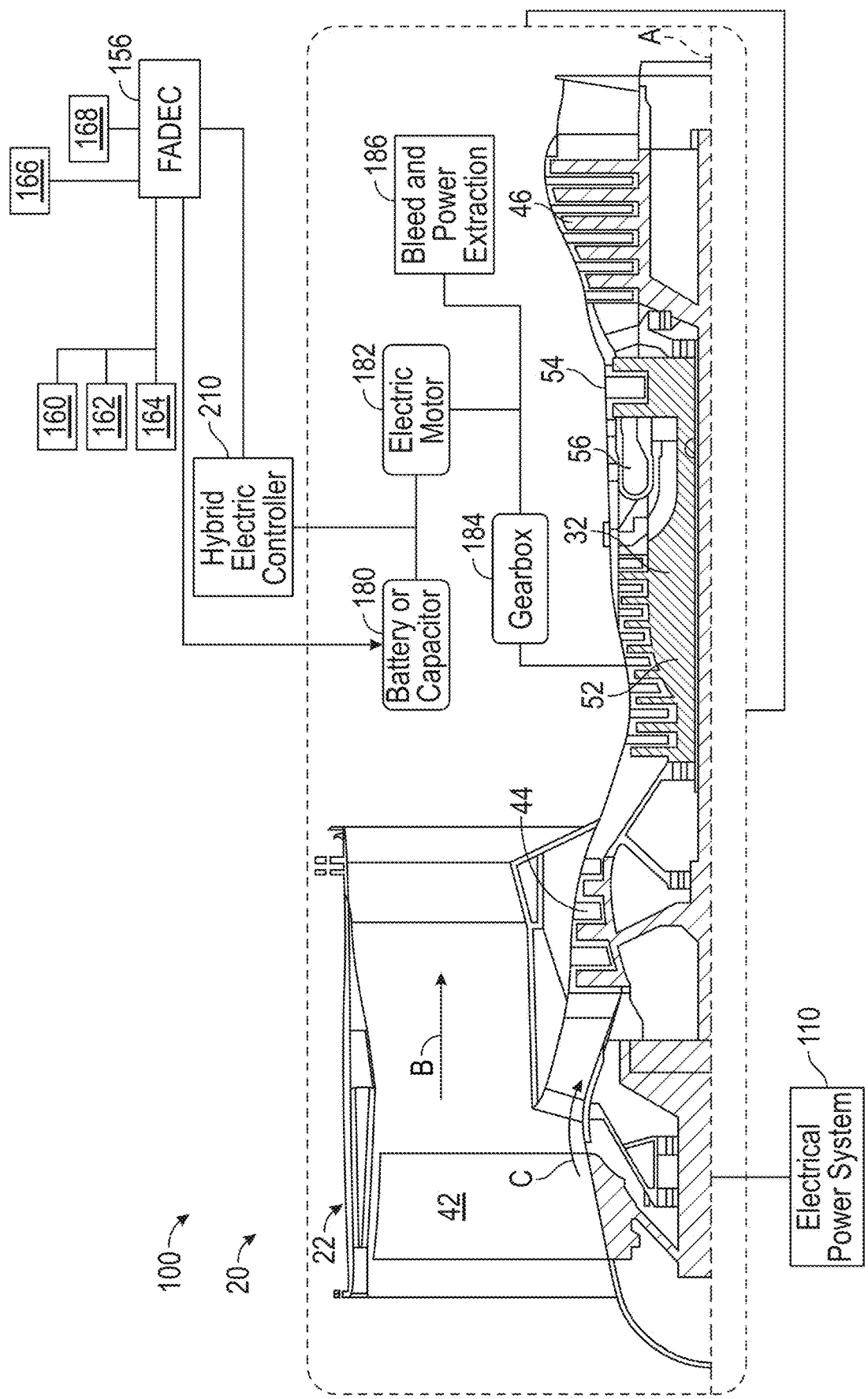
FIG. 1C is a partial cross-sectional view of a hybrid electric gas turbine engine according to one or more embodiments described herein.

FIG. 1C is a partial cross-sectional view of a hybrid electric gas turbine engine (also referred to as hybrid electric propulsion system 100) according to one or more embodiments described herein. The hybrid electric propulsion system 100 (also referred to as hybrid electric gas turbine engine 100) includes the gas turbine engine 20 operably coupled to an electrical power system 110 as part of a hybrid electric aircraft in accordance with one non-limiting embodiment of the present disclosure. In this embodiment, the engine 20 has a power source 180 such as a battery, a super capacitor, an ultra-capacitor, a fuel cell with chemical storage, or an equivalent thereof, which supplies power to a motor 182, which is connected to an engine accessory gearbox 184 that is operably coupled to the high speed spool 32 such that the motor 182, when operated will provide power assist to the high speed spool 32 via the accessory gearbox 184. In other words, the accessory gearbox will have at least one component (e.g., a gear train or other equivalent device) operably coupled to the high speed spool 32 and the motor 182 such that operation of the motor 182 will rotate the component which in turn will rotate the high speed spool 32. The power assist to the high speed spool 32 via the motor 182 will add enough stability to the high pressure compressor in order to allow, for example, re-starting without external power assist which may be provided by an auxiliary power unit (APU).

In one non-limiting embodiment, the motor 182 may be configured to provide power assist to the high speed spool 32. Alternatively, the motor 182 may be part of a different configuration or system configured to only provide power assist to the high speed spool 32 in order to expand an in-flight re-start envelope. In yet another example, the motor 182 may be configured to provide power assist to the low speed spool 30. For example, in an alternative embodiment, the motor 182 may be operatively coupled to the low speed spool 30 via accessory gearbox 184 in order to provide additional thrust to the engine 20. In one or more examples, power can be extracted from the electric motor 182 (e.g., from one or more of the low spool or high spool) at block 186 to power engine accessories, aircraft loads such as environmental control systems, etc.

According to an embodiment, the power source 180 and the motor 182 of the power assist system 186 are under the full authority of a full authority digital engine control (FADEC) 156, which controls the power source and the engine. The FADEC 156 is an example of a controller that can include a processing system 160, a memory system 162, and an input/output interface 164. The processing system 160 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the FADEC 156 can be said to include processing circuitry. The memory system 162 can store data and instructions that are executed by the processing system 160. In embodiments, the memory system 162 may include random access memory (RAM), read only memory (ROM), or other electronic, optical, magnetic, or any other computer readable medium onto which is stored data and algorithms in a non-transitory form. The input/output interface 164 is configured to collect sensor data from the one or more system sensors and interface with various components and subsystems, such as components of motor drive electronics, rectifier electronics, an energy storage management system, an integrated fuel control unit, actuators, and/or other components of the hybrid electric propulsion system 100. The FADEC 156 provides a means for controlling hybrid electric system control effectors 168 based on a power transfer control 166 that is dynamically updated during operation of the hybrid electric propulsion system 100. The means for controlling the hybrid electric system control effectors 168 can be otherwise subdivided, distributed, or combined with other control elements.

The FADEC 156 can also include various operational controls, such as a power transfer control that controls hybrid electric system control effectors. The power transfer control 166 can apply control laws and access/update models to determine how to control and transfer power to and from the hybrid electric system control effectors 168. For example, sensed and/or derived parameters related to speed, flow rate, pressure ratios, temperature, thrust, and the like can be used to establish operational schedules and transition limits to maintain efficient operation of the gas turbine engine 20.

Additionally or alternatively, the hybrid electric propulsion system 100 can include a hybrid electric controller 210, which may be integrated into or separate from the FADEC 156. The hybrid electric controller 210 is communicatively coupled to the power source 180, the motor 182, and/or any other suitable components. The features and functionality of the hybrid electric controller 210 are described in more detail herein with respect to FIG. 2.

An aircraft can selectively power a hybrid electric engine, such as the hybrid electric gas turbine engine 100 of FIG. 1C, by providing electric power from a battery source and/or liquid fuel (jet fuel). During certain stages during a flight plan (e.g., taxi, cruise), electric power may be more efficient. However, during other stages (e.g., takeoff, climb), it may be more efficient to power the engine with liquid fuel. For example, during taxi, electric power may be more efficient, and thus the battery may be utilized to power the hybrid electric engine during taxi. In some examples, the hybrid electric controller 210 can selectively provide electric power or liquid fuel (jet fuel) based on considerations other than efficiency (e.g., engine health, operating conditions, etc.).

One use case for the hybrid electric gas turbine engine 100 is to use electric power from a battery source to power the hybrid electric gas turbine engine 100 during taxi. This is referred to as electric taxi or "e-taxi," which has been shown to reduce energy use. In some situations, e-taxi may not be the most beneficial use of electric power from the battery source. For example, in certain situations, it may be more useful to use the electric power from the battery source to power the low speed spool electric machine 60 and/or the high speed spool electric machine 62 during flight to increase time on wing of the gas turbine engine 20. Time on wing refers to the amount of time an engine (e.g., the gas turbine engine 20) spends on the aircraft in operating condition as opposed to periods of service/maintenance.

One or more embodiments described herein relate to managing battery usage for a hybrid electric engine of an aircraft based on a flight plan and/or data received during the flight. Additionally and/or alternatively, one or more embodiments described herein relate to managing battery charging for a hybrid electric engine of an aircraft based on an energy reserve requirement and an e-taxi energy usage estimation. In order to increase the time on wing of an engine, one or more embodiments described herein analyze data to determine whether the engine needs electric power from the battery source for durability concerns. If so, e-taxi can be disabled/skipped and instead the electric power is used during flight to boost the low speed spool 30 and/or the high speed spool 32, and/or other aircraft systems such as an environmental control system (ECS) that would otherwise draw from the engine. Examples of data that the present techniques can analyze to make this determination can include a flight plan, a derate setting, engine health data, operating conditions, engine cycle or flight hour count, and the like.

According to one or more embodiments described herein, the present techniques can determine not to perform e-taxi in one or more of the following scenarios: when a margin/limit is expected to be exceeded on a particular day on a particular flight point but would not be exceeded if a particular spool is boosted at the particular flight point; when a component is predicted to drive early engine removal without assistance; when the aircraft is operating in an extreme environment (e.g., high altitude, high temperature, etc.); as part of a contract; to affect in-service issues (e.g., speed keep out zones, vibes, an engine program missing hot section repair interval (HSRI) targets, etc.); during an aborted landing (instead, use electric power to boost climb); and/or based on a pilot determination/recommendation.

According to one or more embodiments described herein, a vehicle (e.g., an aircraft) can include a battery. The vehicle can be certified to operate without using at least a portion of the battery. The vehicle can be certified to operate with any output of battery energy spend logic available. At least a portion of the battery energy can be used for energy optimization or to mitigate severity of operating conditions (e.g., temperature, speed, etc.). The vehicle can receive, calculate, and/or store data on engine derate settings, ambient conditions, altitude, component life, component margin trending, manual override of energy optimization, remotely commanded override of energy optimization, etc. The vehicle can receive and/or create data indicating use of energy storage to prevent exceedance of a margin or limit. The threshold for exceedance of the margin or limit can be defined using known statistical techniques. For example, it can be defined probabilistically. A cost of the limit exceedance multiplied by a probability of limit exceedance can be compared to a cost of energy savings, and the vehicle can allocate and apply battery energy for prevention of limit or margin exceedance in response thereto. The vehicle can forgo or reduce energy optimization use of battery energy when using the battery for margin exceedance prevention. The vehicle can receive and/or calculate data indicating which component is more likely to drive engine removal for maintenance/service. The vehicle can estimate and/or receive data on which use of battery energy may most affect component degradation in the future. The vehicle can apportion battery energy to change the time or reasons for engine removal or maintenance/service based on predictive modeling of the effect of energy apportionment.

According to one or more embodiments described herein, a vehicle is provided with a capability to taxi using electric motors or combustion in gas turbine engines. The vehicle can operate an onboard model to predict outcomes of different energy usage (e.g., electric power vs. liquid fuel). The vehicle can receive data instructing a use of battery energy. The vehicle can taxi with combustion in gas turbine engines and apply battery energy to a spool of one of the gas turbine engines during a takeoff or climb.

According to one or more embodiments described herein, an aircraft is provided. The aircraft experiences a rejected/aborted landing and proceeds to take off power. The aircraft uses e-taxi-in energy for boosting spool during a go-around or rejected/aborted landing. An onboard digital twin and FADEC engine control can perform calculations to determine whether an engine should be started for taxi or whether e-taxi can be used before initiating fuel flow to the engines. An offboard prediction system can provide an e-taxi determination by assessing durability/margin. In the event that the battery energy is desired to be reserved, the e-taxi configuration can operate with one engine off and the second engine powering the fan of the first without using battery.

Figure 2:
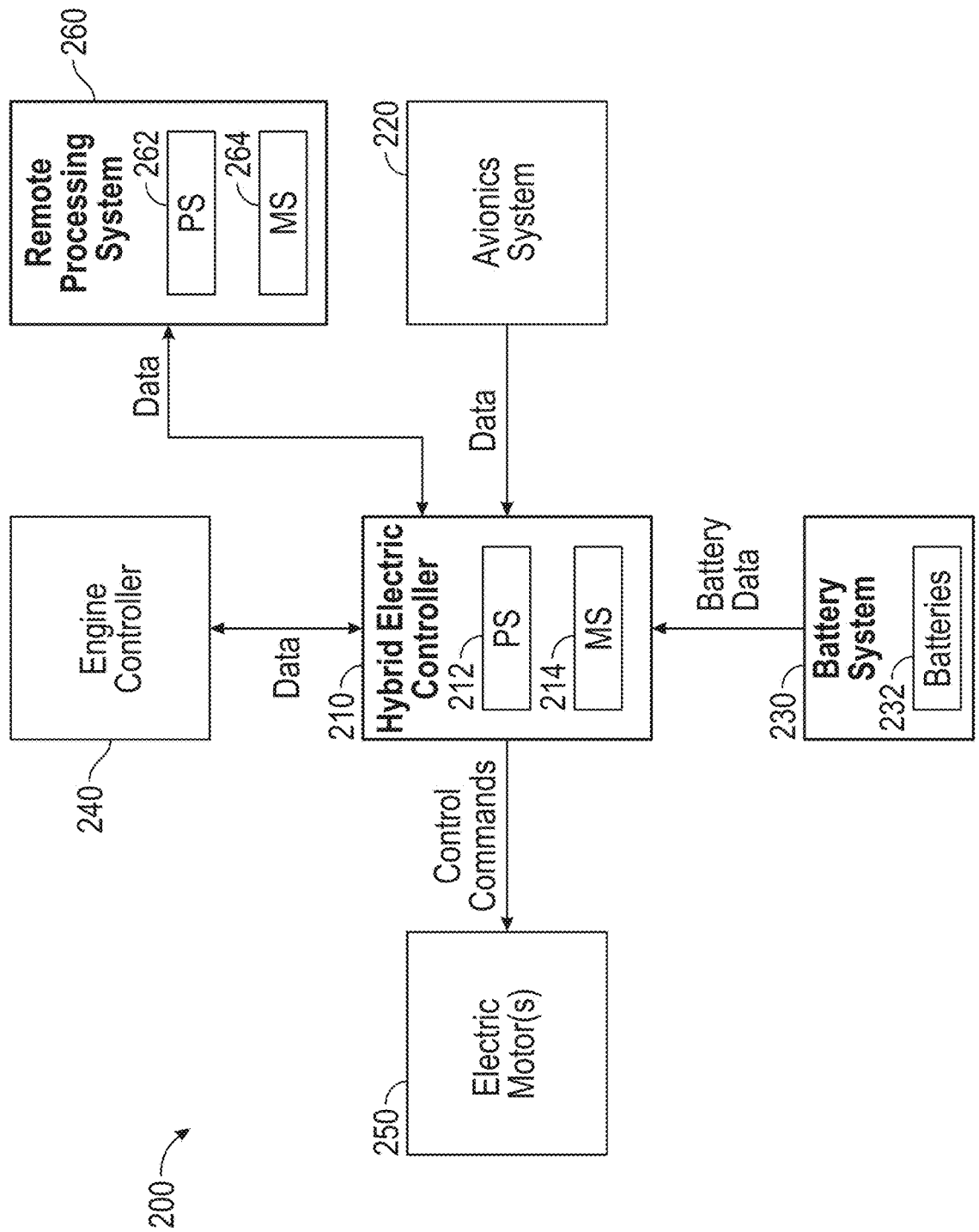
FIG. 2 is a block diagram illustrating a system for managing a hybrid electric engine of an aircraft based on engine health according to one or more embodiments described herein.

Referring now to FIG. 2, with continued reference to FIGS. 1A-1C, FIG. 2 is a block diagram illustrating a system 200 for managing battery usage for managing a hybrid electric engine of an aircraft based on engine health according to one or more embodiments described herein. The system 200 includes a hybrid electric controller 210 that is communicatively coupled to an avionics system 220, a battery system 230, an engine controller 240, electric motor(s) 250, and a remote processing system 260. Although not shown, it should be appreciated that one or more of the avionics system 220, the battery system 230, the engine controller 240, the electric motor(s) 250, and the remote processing system 260 can be communicatively coupled directly or indirectly together independent of the hybrid electric controller 210.

The hybrid electric controller 210 can include a processing system (PS) 212 and a memory system (MS) 214. The processing system 212 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the hybrid electric controller 210 can be said to include processing circuitry. The memory system 214 can store data and instructions that are executed by the processing system 212. In embodiments, the memory system 214 may include random access memory (RAM), read only memory (ROM), or other electronic, optical, magnetic, or any other computer readable medium onto which is stored data and algorithms in a non-transitory form.

The hybrid electric controller 210 receives data, such as flight plan data for a flight plan, from the avionics system 220. The flight plan defines an aircrafts planned route or flight path. Examples of flight plan data include, for example, departure and arrival locations, estimated flight time, planned cruising speed and altitude, etc. The hybrid electric controller 210 also receives battery data from the battery system 230. The battery data indicates how much electric energy (e.g., a number of kilowatt hours of electric energy) is available from one or more batteries 232 associated with the battery system 230. The hybrid electric controller 210 determines waypoints, as further described herein, for when to apply electric power (also referred to as "battery energy") from the battery system to the electric motor(s) 250 based at least in part on the flight plan data and the battery data. The electric motor(s) 250 can include any suitable electric motor, such as the low speed spool EM 60 of FIG. 1B, the high speed spool EM 62 of FIG. 1B, and/or the electric motor 182 of FIG. 1C, which can provide power assist to the low speed spool 30 and/or the high speed spool 32 of the gas turbine engine 20.

The hybrid electric controller also receives data from the engine controller 240, which is an example of the FADEC 156 of FIG. 1C. The data represents data about the aircraft, such as avionics information (which can alternatively and/or additionally be received directly from the avionics system 220), engine power settings, etc. The hybrid electric controller 210 can also send data and/or commands to the engine controller 240, such as to cause the engine controller 240 to control one or more aspects of the hybrid electric propulsion system 100.

The remote processing system 260 can be one or more processing systems remote from the hybrid electric controller 210 and/or remote from the aircraft. For example, the remote processing system 260 can be a ground-based system(s) that can provide data, such as weather data, operating conditions data, operational recommendations, etc., to the hybrid electric controller 210. The remote processing system 260 can include a processing system (PS) 262 and a memory system (MS) 264. The processing system 262 can include any type or combination of central processing unit (CPU), including one or more of: a microprocessor, a digital signal processor (DSP), a microcontroller, an application specific integrated circuit (ASIC), a field programmable gate array (FPGA), or the like. Thus, the remote processing system 260 can be said to include processing circuitry. The memory system 264 can store data and instructions that are executed by the processing system 262. In embodiments, the memory system 264 may include random access memory (RAM), read only memory (ROM), or other electronic, optical, magnetic, or any other computer readable medium onto which is stored data and algorithms in a non-transitory form.

Figure 3A:
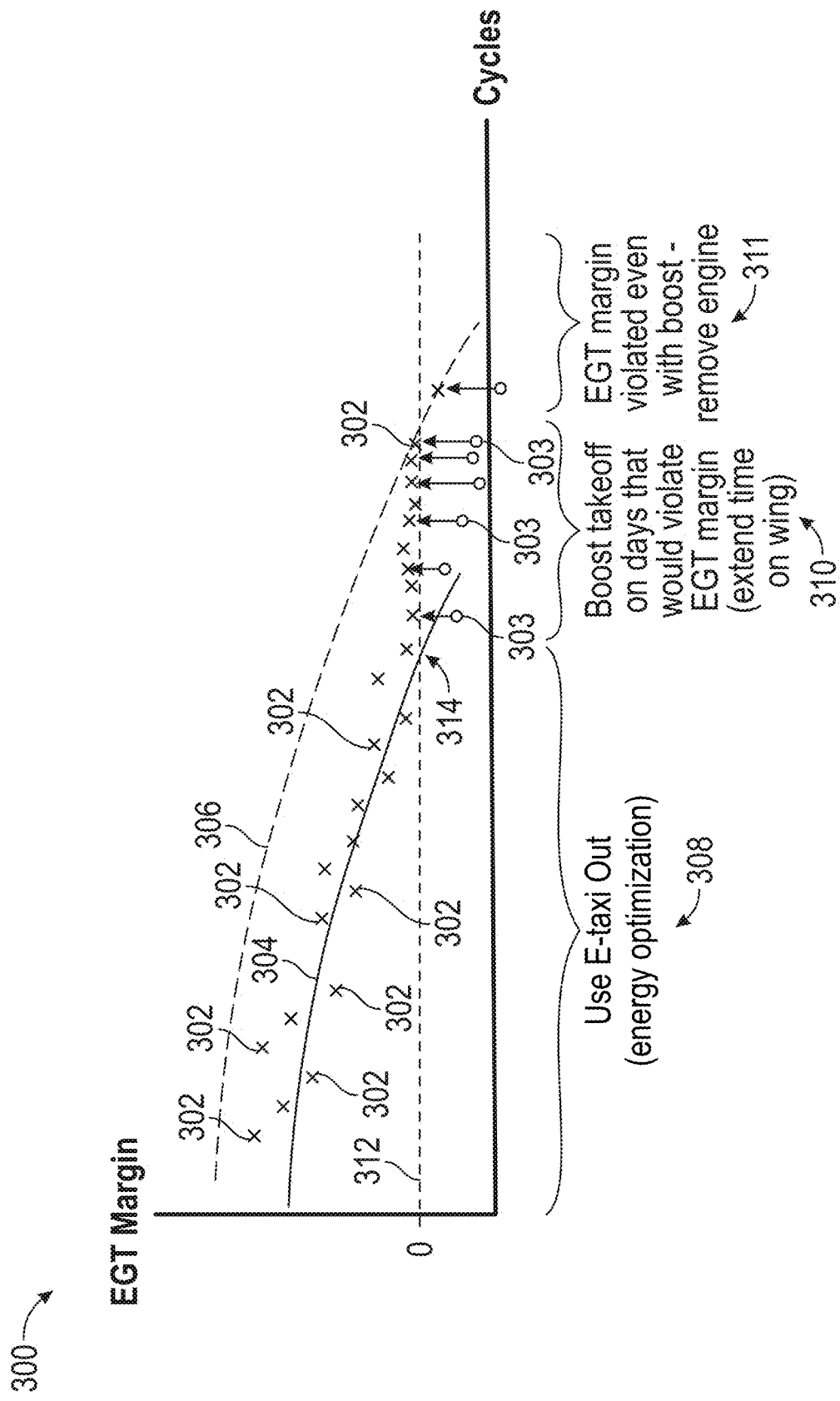
FIG. 3A depicts a graph of extra margin for operating an engine, such as the engine of FIGS. 1A-1C, according to one or more embodiments described herein.

FIG. 3A depicts a graph 300 of extra margin for operating an engine, such as the engine 20 of FIGS. 1A-1C, according to one or more embodiments described herein. As shown, the graph 300 plots exhaust gas temperature (EGT) margin for the engine 20 for a number of cycles, where each cycle represents one flight. In this example, it is assumed that the battery system 230 can provide sufficient electric power to the engine 20 (such as via one or more of the low speed spool EM 60 or the high speed spool EM 62 of FIG. 1B) to boost takeoff. For example, a battery system that stores 100 kWh of electric energy may be able to provide about 4 MW of boost power for 82 seconds during takeoff or alternatively to power electric taxi for twenty minutes. In some cases, such as to prolong the time until engine maintenance/service is required, it is desirable to use this electric power to provide boost to the engine 20 while forgoing the benefits of energy savings associated with e-taxi by skipping e-taxi and taxiing instead using combustion in one or both gas turbine engines.

The graph 300 includes points 302, which indicate in this example measured exhaust gas temperature margin recorded on previous flights. Thus, the points 302 in FIG. 3A represent historical flight data. This margin may be higher on cold days and lower on hot days, but in general decreases as the engine components deteriorate over many cycles (flights). This recorded margin can be used in conjunction with other recorded parameters from those flights to predict the margin that will be available on subsequent flights, particularly when the ambient takeoff conditions or other operating parameters are known in advance of a flight. The margin trend represented by the points 302 can be plotted using a trend line 304 associated with a reference set of ambient conditions and a distribution determined using known statistical techniques to account for uncertainty in the prediction.

The graph 300 also includes a margin improved by the available electric boost shown as line 306. This represents the calculated effect of an applied boost on the margin. For example, 1 MW of low spool boost may increase EGT margin by 20 degrees F. during takeoff.

As shown, the graph 300 includes a first region 308, a second region 310, and a third region 311. During the first region 308, battery energy is apportioned for energy optimization use such as e-taxi (e.g., e-taxi out) because the threshold 312 is not expected to be violated under any takeoff conditions when using energy optimization and no low spool boost during takeoff.

After a number of engine cycles, for example 6000 cycles, components of the engine have deteriorated enough that the engine is expected to have zero or less than zero margin on a flight based on the measured ambient conditions and the trend line 304. This prediction marks the beginning of the second region 310, wherein battery energy may be apportioned for boost during takeoff to achieve extra margin up to the maximum margin available with boost, line 306. For ambient conditions and operating parameters predicted to result in positive margin above the threshold 312, e-taxi can continue to be performed; however, for conditions predicted to result in margin below the threshold 312, e-taxi is skipped or reduced in duration and the electric power of the battery system 230 is instead used for another purpose, such as to boost takeoff. In these cases taxi is performed using combustion of fuel in a gas turbine. The points 303, which fall below the threshold 312, represent predicted margin without boost. Each point 303 in region 310 has a corresponding point 302 that has been increased to positive margin by applying boost to takeoff. After sufficient cycles beyond region 310 (e.g., in region 311), EGT margin may fall below threshold even while forgoing e-taxi and instead boosting takeoff with all available power. Once the EGT margin threshold 312 is crossed, the engine would be removed for maintenance having delayed maintenance for a significant number of additional flights beyond region 308. In other embodiments any other engine performance parameter may be monitored for margin or component life assessment with and without boost of either spool.

Figure 3B:
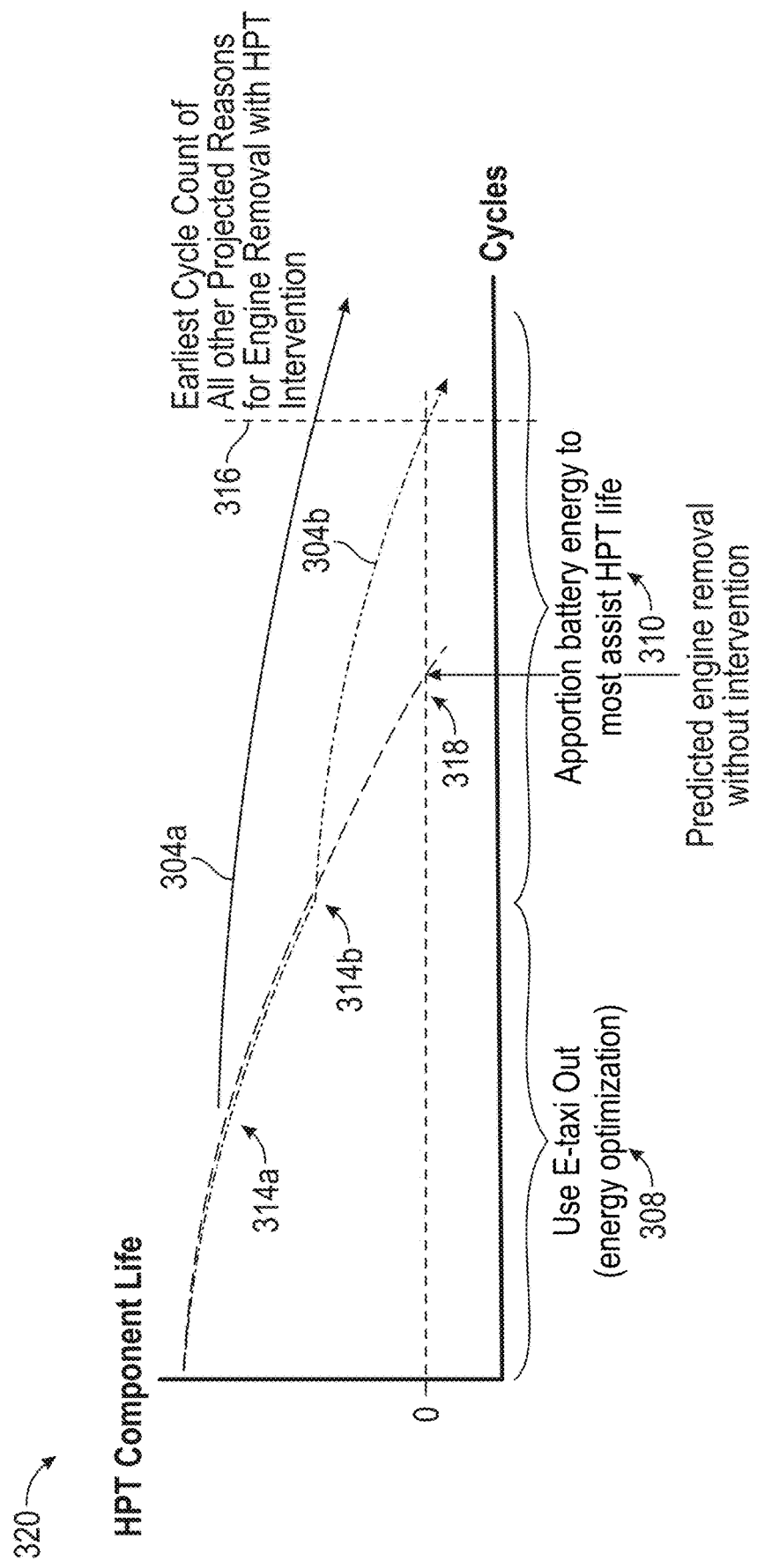
FIG. 3B depicts a graph of a predicted degradation of an engine, such as the engine of FIGS. 1A-1C, according to one or more embodiments described herein.

FIG. 3B depicts a graph 320 of a measured and predicted degradation of an engine component, such as the high pressure turbine of engine 20 of FIGS. 1A-1C, according to one or more embodiments described herein. In this example, it is shown that the decay rate of trend lines 304a, 304b can change when battery energy is apportioned to assist the HPT (region 310) compared to when it is used for energy optimization such as e-taxi (region 308). This occurs because the HPT will deteriorate faster with higher operating temperatures and electric boost lowers operating temperatures to slow deterioration. Particularly, multiple trend line predictions 304a and 304b are shown. Also shown is an estimate of engine removal date due to other causes of engine removal besides end of HPT component life at the threshold 316. At the cycle associated with inflection point 314a, the controller estimates HPT component life progression with and without assistance from battery energy and compares to engine removal due to other reasons, e.g., the threshold 316. At the inflection point 314a, HPT life progression with assistance, 304a, is determined to exceed another reason for removal, e.g., the threshold 316, so energy continues to be used for e-taxi rather than HPT assistance on cycle 314a. On cycle 314b, the controller estimates that battery assistance will improve HPT life and that the HPT reaching zero life will be the reason for engine removal even with battery assistance, so battery energy is apportioned for HPT assistance on cycle 314b and beyond, unless some other cause is eventually predicted to drive engine removal instead. In this way, the end of component life is determined every flight and battery energy is apportioned either for energy optimization or to extend the predicted life of the component expected to drive engine removal (the point 318).

Figure 4:
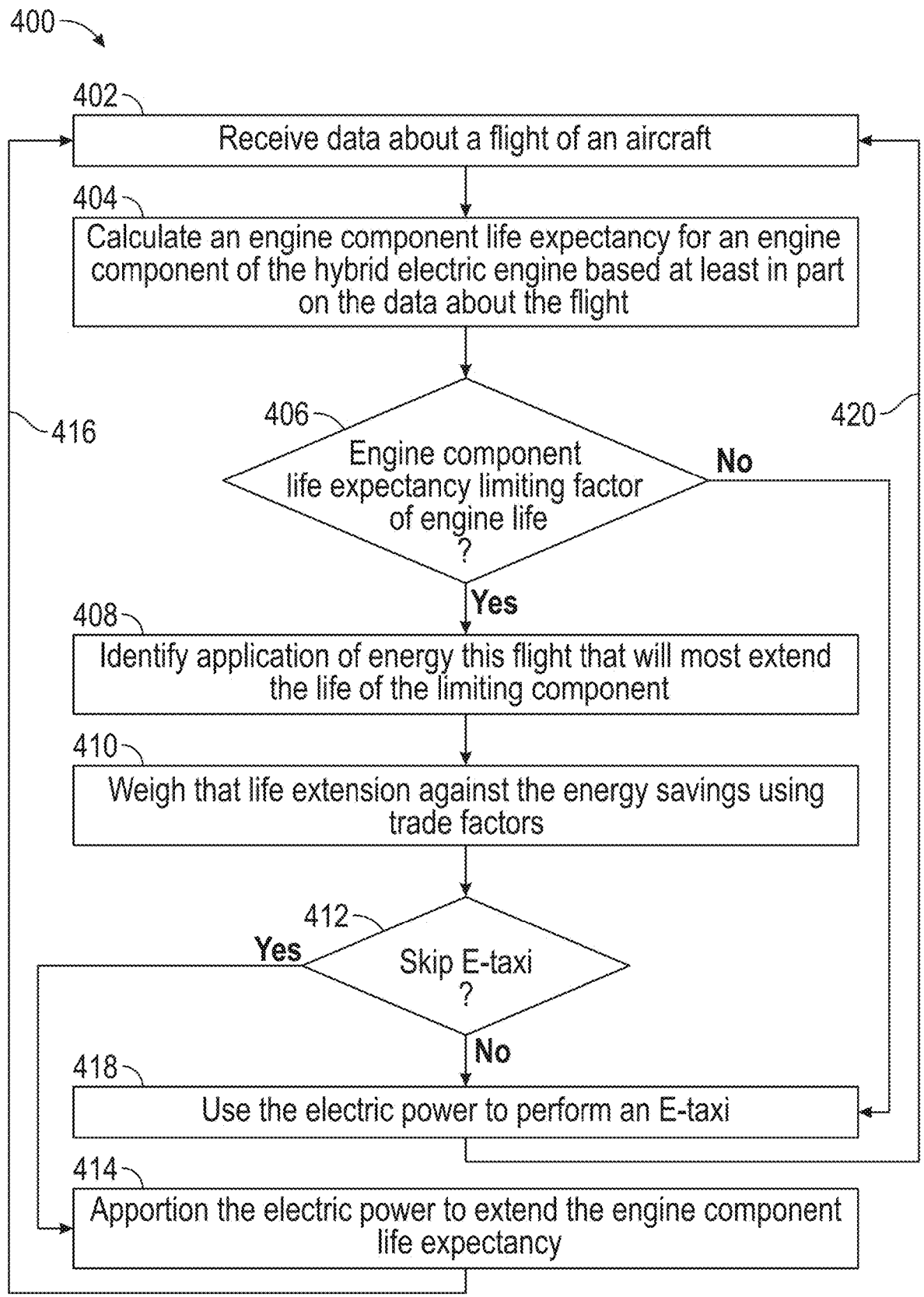
FIG. 4 is a flow chart of a method for managing a hybrid electric engine of an aircraft based on engine health according to one or more embodiments described herein.

FIG. 4 is a flow chart of a method for managing energy usage for a hybrid electric engine of an aircraft based on engine health according to one or more embodiments described herein. Managing energy usage can include managing energy provided by any suitable type of energy source, such as a battery, a fuel cell, a capacitor, etc. The method 400 may be performed, for example, by the hybrid electric controller 210, the remote processing system 260, and/or another suitable device or system.

At block 402, the hybrid electric controller 210 receives flight data. The flight data could be data about an upcoming/next flight, historical fight data about prior flights, data about operating conditions during a prior flight(s), operating conditions excepted for an upcoming/next flight, and/or other relevant data. In one or more examples, the flight data can indicate a cycle count (e.g., number of flights). The hybrid electric controller 210 can receive the data from the avionics system 220 (e.g., flight plan data for the flight), the battery system 230 (e.g., battery data), the engine controller 240 (e.g., data about the aircraft such as avionics data, engine power settings, etc.), and/or the remote processing system 260 (e.g., weather data, ground conditions, airport information, etc.). In examples, the data can include one or more of ambient conditions (e.g., temperature, humidity, altitude of the departure airport, etc.), an estimated health state of the engine component (e.g., a number of cycles/flights that the engine component has undergone, an amount of time the engine component has operated, etc.), a derate setting (e.g., an indication that a full rate for takeoff is not needed), flight plan data (e.g., departure and arrival locations, estimated flight time, planned cruising speed and altitude, etc.), and/or other suitable data.

Using the data received at block 402, the hybrid electric controller 210 calculates an engine component life expectancy for an engine component of the engine 20 at block 406. An example of the engine component is a high pressure turbine (HPT) of the hybrid electric engine 20, and in such an example, the engine component life expectancy is a HPT component life expectancy. Calculating the engine component life expectancy is performed by a method of health estimation and deterioration prediction such as calibrating a model of an engine with data received in previous flights, running that model with predictions of future flight conditions to estimate engine conditions such as rotor speed and turbine temperature in future flights, then applying those engine conditions to component life models in a process sometimes referred to as a digital twin process. Models of engines and life models may include combinations of analytical and empirical models, probabilistic modeling, and uncertainty quantification. Alternatively, calculating component life expectancy may be performed by some other form of prognostic such as referencing different pre-estimated deterioration rates with and without electrical assistance projected from an estimated current component life.

At decision block 406, it is then determined whether the engine component life expectancy is indicative of a reason for removal of the engine for maintenance. That is, it is determined whether the component associated with the engine component life expectancy would be the reason for pulling the engine 20 for maintenance/service (e.g., the time until maintenance is based on the engine component life expectancy as opposed to another component or factor). Said another way, it is determined whether the engine component life expectancy is the limiting factor to engine maintenance.

If it is determined at decision block 406 that the engine component life expectancy is indicative of the reason for removal of the engine for maintenance (that is, the component is the limiting factor to engine maintenance), the method 400 proceeds to determine whether a use of battery energy will increase engine component life expectancy a threshold amount (e.g., an amount that is known to extend the engine component life expectancy). Specifically, at block 408, an application of energy this flight that will most extend the life of the limiting component 408. For example, the application of energy could be to perform e-taxi (full or partial), perform a takeoff boost, perform a climb boost, etc. At block 410, that life extension (from block 408) is weighed against the energy savings using trade factors that may be operator specific, such as how important it is to extend the life of the limiting component as compared to current energy savings. At block 412, it is then determined whether to skip e-taxi. If it is determined to skip e-taxi at decision block 412, the hybrid electric controller 210 apportions the electric power (e.g., the electric power from the battery system 230) to extend the engine component life expectancy at block 414. For example, the electric power can be used at pinch points (e.g., take off, climb, etc.) to extend the time until engine maintenance. In such cases, e-taxi is skipped. In some examples, an audible and/or visual alert (such as to a pilot on a display (not shown) of the aircraft, an operation center via the remote processing system 260, a ground crew via the remote processing system 260, etc.) can be issued. The method 400 can restart for a subsequent flight as shown by the arrow 416.

If it is determined at decision block 406 that the engine component life expectancy is not indicative of the reason for removal of the engine for maintenance (that is, the component is not the limiting factor to engine maintenance), or if it is determined at decision block 412 to not skip e-taxi, the hybrid electric controller 210 uses the electric power from the battery system 230 of the aircraft to perform an e-taxi at block 418. The method 400 can restart for a subsequent flight as shown by the arrow 420.

An advantage of one or more embodiments described herein is that time on wing of an engine can be significantly extended. That is, the amount of time between engine maintenance events can be extended, such as by about 2000 cycles/flights, while still using e-taxi for many of those cycles.

While the above description has described the flow process of FIG. 4 in a particular order, it should be appreciated that unless otherwise specifically required in the attached claims that the ordering of the steps may be varied.

It should be appreciated at the determination of whether to perform e-taxi or skip e-taxi in favor of apportioning electric power from the battery system of the aircraft to extend the engine component life expectancy can be performed onboard the aircraft (e.g., by the FADEC 156, the hybrid electric controller 210, or another suitable device/system) or offboard (e.g., by the remote processing system 260).

Figure 5:
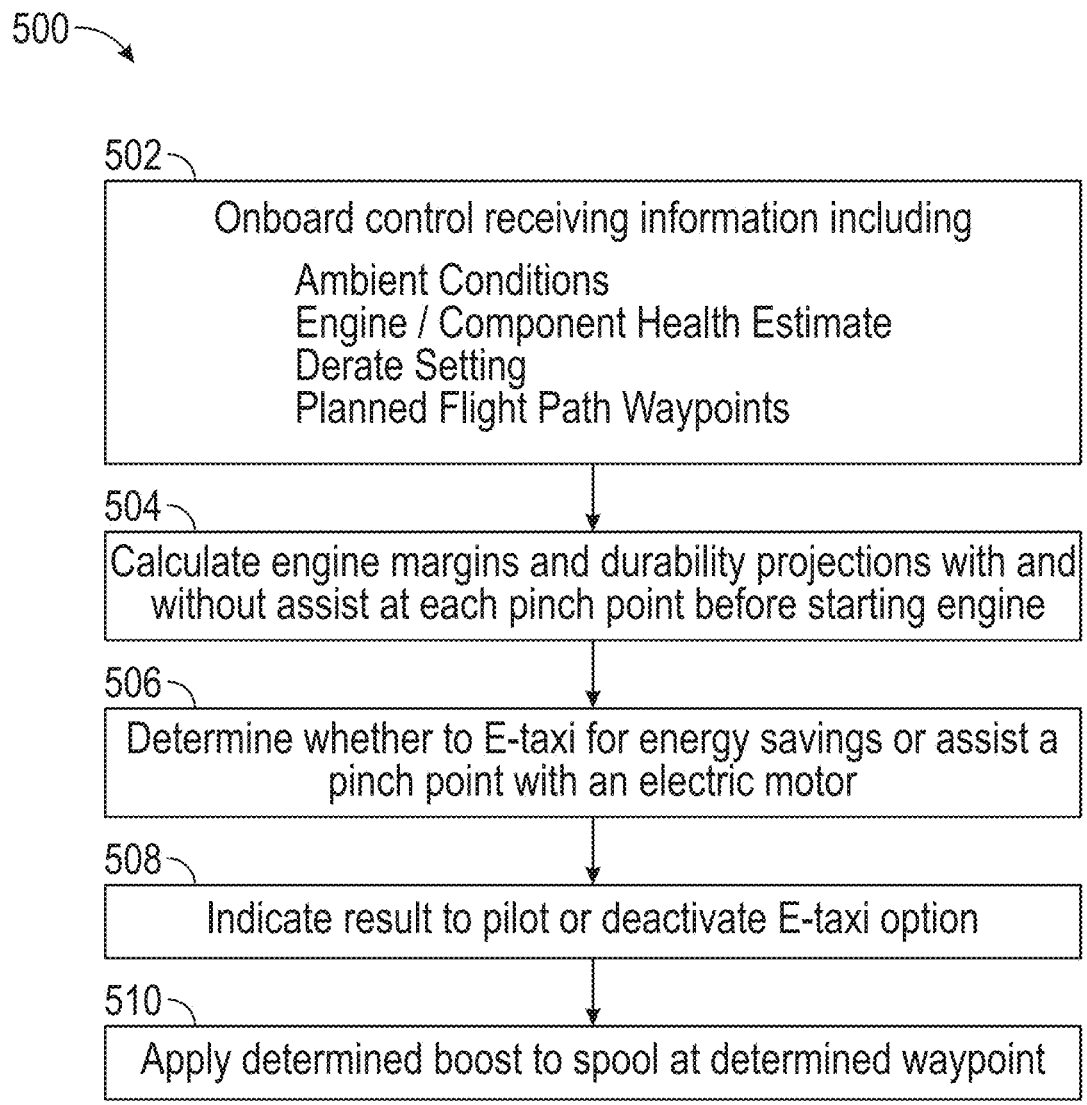
FIG. 5 depicts an example method of determining whether to skip e-taxi onboard the aircraft according to one or more embodiments described herein.

FIG. 5 depicts an example method 500 of determining whether to skip e-taxi onboard the aircraft according to one or more embodiments described herein. At block 502, an onboard controller (e.g., the FADEC 156, the hybrid electric controller 210, etc.) receives information, such as ambient conditions, engine/component health estimates, a derate setting, planned flight pathways, etc. At block 504, the onboard controller calculates engine margins and durability projections with and without assist at each pinch point before starting an engine. For example, as shown in FIGS. 3A and 3B, the engine margin and durability projections are plotted based on the data received at block 502. An example of a pinch point is that the aircraft is taking off from a high altitude airport on a hot day. At block 504, the onboard controller determines whether to e-taxi for energy savings or whether to assist a pinch point with an electric motor. If, for example, the aircraft is taking off from a high altitude airport on a hot day, the onboard controller can determine to skip e-taxi and assist with takeoff and climb by providing electric power to the engine 20. At block 508, the decision from block 506 is indicated (such as to a pilot of the aircraft) and/or the e-taxi option is deactivated. At block 510, electric power is provided at the appropriate waypoint. For example, if e-taxi is skipped and the takeoff and climb are determined to need extra power, the electric power are provided during the takeoff and climb waypoints. If, however, the e-taxi is not skipped, the electric power is provided during the e-taxi.

Figure 6:
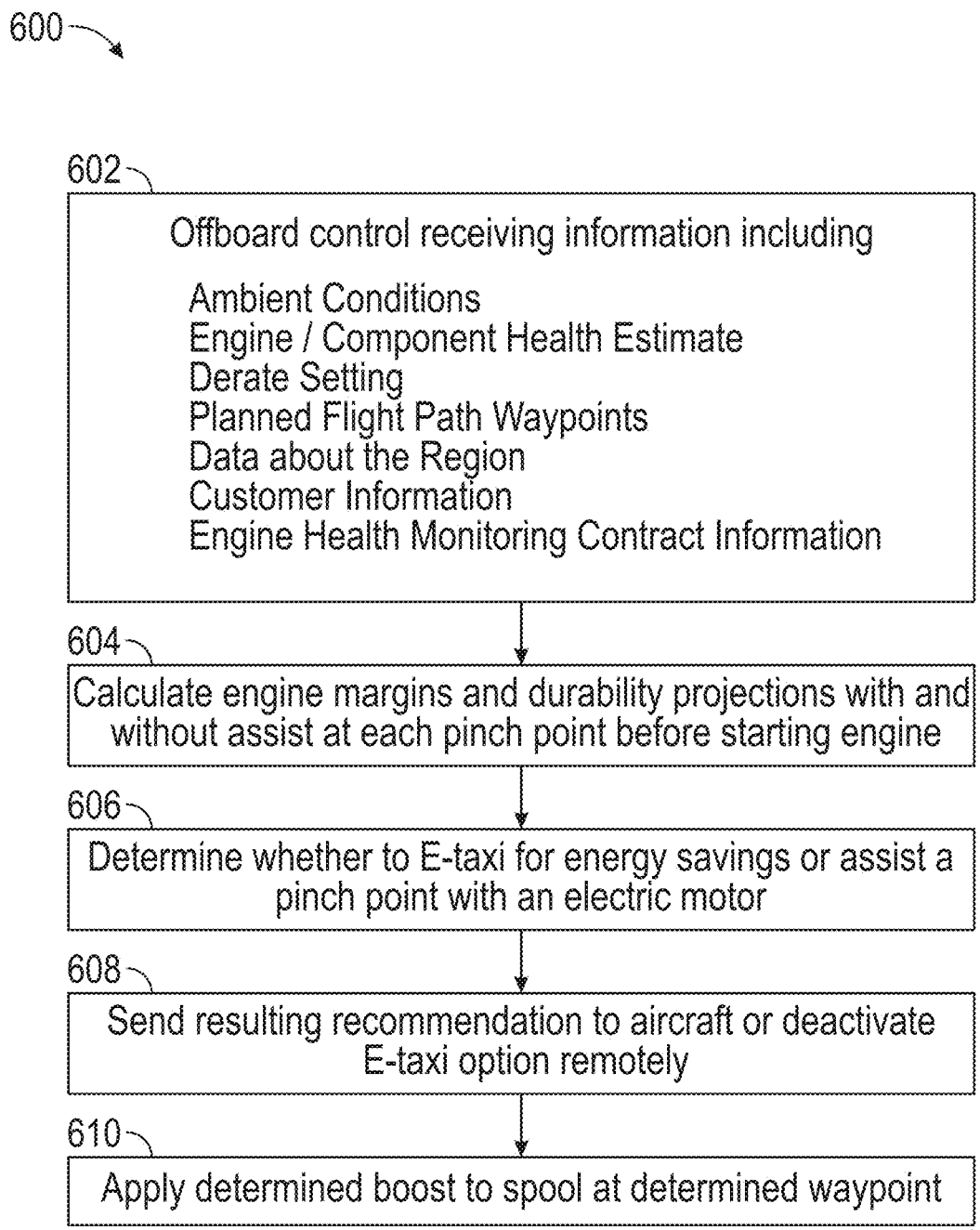
FIG. 6 depicts an example method of determining whether to skip e-taxi offboard the aircraft according to one or more embodiments described herein.

FIG. 6 depicts an example method 600 of determining whether to skip e-taxi offboard the aircraft according to one or more embodiments described herein. At block 602, an offboard controller (e.g., the remote processing system 260, etc.) receives information, such as ambient conditions, engine/component health estimates, a derate setting, planned flight pathways (path waypoints), data about the region, customer information, engine health monitoring contract information, etc. At block 604, the offboard controller calculates engine margins and durability projections with and without assist at each pinch point before starting an engine. For example, as shown in FIGS. 3A and 3B, the engine margin and durability projections are plotted based on the data received at block 602. An example of a pinch point is that the aircraft is taking off from a high altitude airport on a hot day. At block 606, the offboard controller determines whether to e-taxi for energy savings or whether to assist a pinch point with an electric motor. If, for example, the aircraft is taking off from a high altitude airport on a hot day, the onboard controller can determine to skip e-taxi and assist with takeoff and climb by providing electric power to the engine 20. At block 608, the decision from block 606 is transmitted from the offboard controller to an onboard controller (e.g., the FADEC 156, the hybrid electric controller 210, etc.) and/or the e-taxi option is deactivated remotely by the offboard controller. At block 610, electric power is provided at the appropriate waypoint. For example, if e-taxi is skipped and the takeoff and climb are determined to need extra power, the electric power are provided during the takeoff and climb waypoints. If, however, the e-taxi is not skipped, the electric power is provided during the e-taxi.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for managing energy usage for a hybrid electric engine of an aircraft, the method comprising:
   providing the hybrid electric engine, the hybrid electric engine having a gas generating core and an electric machine powered by electric energy;
   determining, by a processing device, whether a use of the electric energy will increase time on wing of the hybrid electric engine of the aircraft a threshold amount; and
   responsive to determining that the use of the electric energy will increase the time on wing the threshold amount, apportioning the electric energy from a battery system of the aircraft to increase the time on wing;
   receiving, by the processing device, flight data;
   wherein determining whether the use of electric energy will increase the time on wing of the hybrid electric engine of the aircraft the threshold amount comprises:
   calculating, by the processing device, an engine component life expectancy for an engine component of the hybrid electric engine based at least in part on the flight data;
   determining, by the processing device, whether the engine component life expectancy is indicative of a reason for removal of the hybrid electric engine for maintenance; and
   determining, by the processing device, whether the use of the electric energy will increase the engine component life expectancy a threshold amount; and
   responsive to the engine component life expectancy being indicative of the reason for removal of the hybrid electric engine for maintenance and responsive to determining that the use of the electric energy will increase the engine component life expectancy the threshold amount, apportioning the electric energy from the battery system of the aircraft to extend the engine component life expectancy.

2. The method of claim 1, further comprising:
   responsive to the engine component life expectancy not being indicative of the reason for removal of the hybrid electric engine for maintenance, or responsive to determining that the use of electric energy will not increase the engine component life expectancy the threshold amount, using the electric energy from the battery system of the aircraft to perform an e-taxi for a flight.

3. The method of claim 1, wherein the flight data comprises ambient conditions.

4. The method of claim 1, wherein the flight data comprises an estimated health state of the engine component or data that is used for estimation of a health state of an engine component.

5. The method of claim 1, wherein the flight data comprises a derate setting.

6. The method of claim 1, wherein the flight data comprises flight plan data.

7. The method of claim 1, wherein the flight data comprises ambient conditions, an estimated health state of the engine component, a derate setting, and flight plan data.

8. The method of claim 1, wherein the engine component is a high pressure turbine of the hybrid electric engine, and wherein the engine component life expectancy is a high pressure turbine component life expectancy.

9. The method of claim 1, further comprising:
   responsive to the engine component life expectancy being indicative of the reason for removal of the hybrid electric engine for maintenance, causing an alert to be issued.

10. The method of claim 1, wherein apportioning the electric energy from the battery system of the aircraft to increase the time on wing comprises causing an e-taxi to be inhibited and applying the electric energy to an engine spool of the hybrid electric engine at a waypoint.

11. The method of claim 1, wherein the processing device is disposed in or on the aircraft.

12. The method of claim 1, wherein the processing device is remote from the aircraft and is communicatively coupled to a controller in or on the aircraft.

* * * * *